March 24, 1970   L. A. CHAMBERLIN, JR., ET AL   3,502,976
METHOD AND SYSTEM FOR MEASURING AND INDICATING THE FREQUENCY
AND PHASE DIFFERENCES BETWEEN A PLURALITY
OF PRECISION FREQUENCY SOURCES
Filed Dec. 30, 1966                                                2 Sheets-Sheet 1
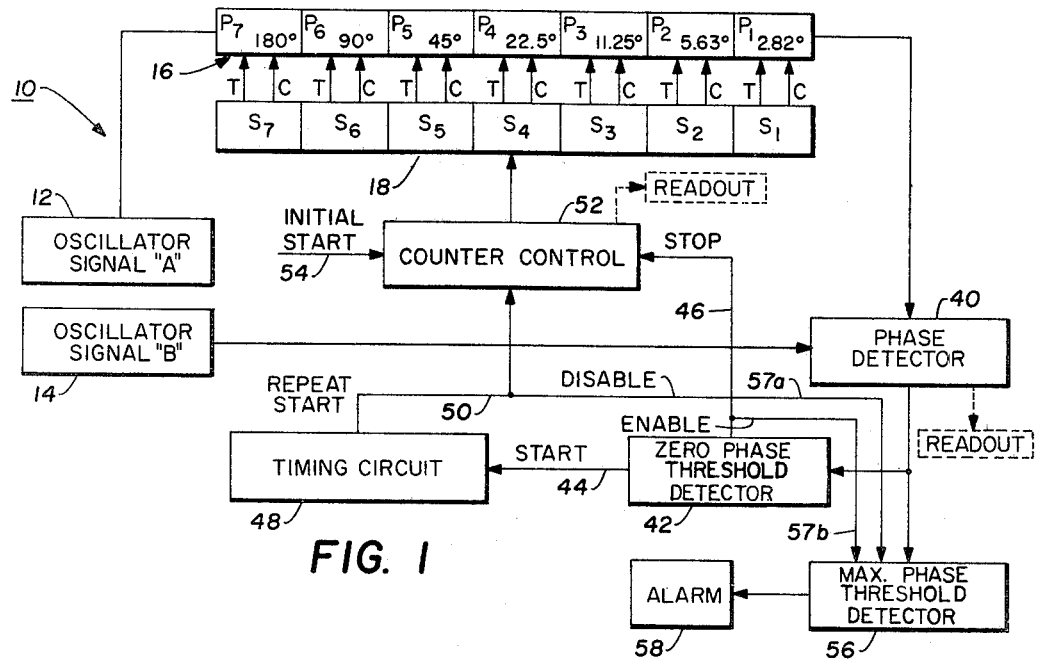
FIG. 1
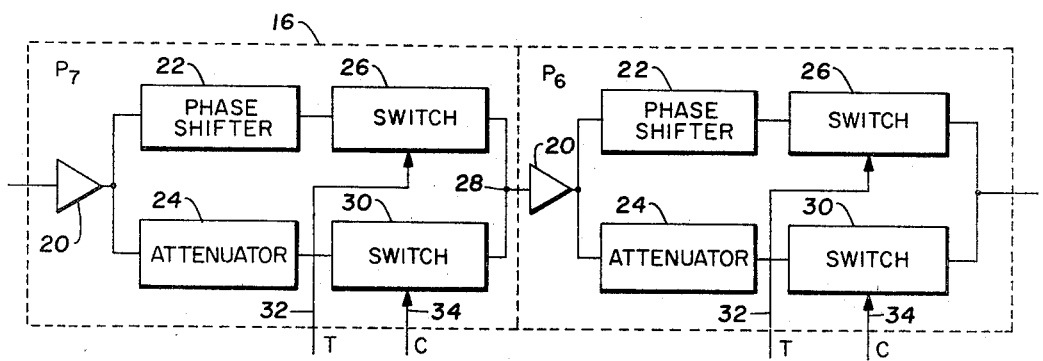
FIG. 2
FIG. 3
INVENTORS:
LEO A. CHAMBERLIN, JR.
DALE E. EDWARDS
ATTORNEY United States Patent Office 3,502,976
Patented Mar. 24, 1970

3,502,976
METHOD AND SYSTEM FOR MEASURING AND INDICATING THE FREQUENCY AND PHASE DIFFERENCES BETWEEN A PLURALITY OF PRECISION FREQUENCY SOURCES
Leo A. Chamberlin, Jr., Richardson, and Dale E. Edwards, Dallas, Tex., assignors to Texas Instruments Incorporated, Dallas, Tex., a corporation of Delaware
Filed Dec. 30, 1966, Ser. No. 606,176
Int. Cl. G01r 23/00, 23/12; H03b 3/04
U.S. Cl. 324—82                                    14 Claims

ABSTRACT OF THE DISCLOSURE

A pair of precision frequency signals having the same nominal frequency are compared by shifting the phase of the first until the two signals are momentarily in phase. Then after a measured time period, the phase difference is measured. The length of the measured period and the measured phase difference are an accurate measure of the difference in frequency of the two signals.

A system for continuously comparing a pair of signals having the same nominal frequency and indicating when the difference in the frequencies exceeds a predetermined minimum. This system features a binary phase shift network operated by a binary counter which successively delays the first signal. A phase detector stops operation of the binary counter when the phase between the signals is zero, and starts a timing circuit. After a predetermined delay period, the counter is restarted and the cycle repeated. A threshold circuit detects if the phase difference during the delay period exceeds a predetermined maximum representative of the maximum difference in the frequencies of the two signals permissible.

A system for determining the center frequency of a redundant set of three signals and for detecting a gross failure of any one of the signals including three of the systems just described for comparing a pair of signals. The phase detector also provides a signal indicating whether the phase shifted signal leads or lags the reference signal. The signals are compared $A-B$, $B-C$, and $C-A$, and logic circuitry used to identify a failed signal source and to select the source with the center frequency.

BACKGROUND OF THE INVENTION

This invention relates generally to measuring and testing, and more particularly relates to the comparison of the frequencies of two or more sine wave voltage signals.

There are many electronic systems which require a reference frequency source of very high precision. This presents considerable problems from the time the reference frequency source is first manufactured through its entire useful life. If a one megacycle source, for example, is to be accurate within one cycle per second, there are very few methods presently available which can be used to measure the frequency with respect to a reference signal with that accuracy. Then once the oscillator is initially calibrated to the desired accuracy, there is a likelihood that its frequency may drift over its useful life due to variations in temperature or changes in the parameters of circuit components due to aging. Monitoring of an oscillator of this type during use presents an even greater problem. The monitoring of an oscillator can, as a practical matter, be best done by comparing it to another reference frequency source. However, in general the second reference frequency source can be no better than the reference frequency source being used. However, the likelihood that two reference frequency sources will both fail at the same time, or drift in the same manner is less than the likelihood that one source will fail or drift. The likelihood that three sources will fail at the same time or drift in the same direction is even less. Thus, by providing redundant frequency sources, even of the same type, and continuously comparing the frequencies of the sources, the reliability of a system can be improved, and the failure of one probably detected.

SUMMARY OF THE INVENTION CLAIMED

A method for measuring the difference in frequency of a pair of precision frequency sources having nominally the same frequency which comprises shifting the phase of one of the signals until the two signals are momentarily in phase alignment, then measuring the degree of phase disalignment resulting during a measured period of time to determine the difference in frequency between the two signals.

A system for comparing the frequency of first and second signals comprising a binary phase shifter for progressively increasing the phase delay of one of the signals, a phase detector for comparing the phase of said one signal with the phase of the other signal, means for detecting when the two signals are in phase and holding the phase shift circuit for a predetermined time period, and means for detecting if the phase difference between the two signals has exceeded a predetermined maximum within the predetermined time period.

A system for selecting the signal having the center frequency of first, second and third signals comprising first, second and third frequency comparison means for comparing the frequencies of the first and second, the second and third, and the third and first, respectively, each frequency comparison means producing a signal indicating which signal of each pair has the greater frequency, and logic means for producing a logic signal representative of the signal having the center frequency from the signals produced by the first, second and third frequency comparison means. Substantially all subject matter disclosed is covered in one or more of the claims.

BRIEF DESCRIPTION OF THE DRAWINGS

FIGURE 1 is a schematic block diagram of a system in accordance with the present invention;

FIGURE 2 is a more detailed schematic block diagram of the binary phase shift network of FIGURE 1;

FIGURE 3 is a truth table illustrating the operation of the binary counter of the system of FIGURE 1.

DESCRIPTION OF PREFERRED EMBODIMENTS

Figure 4:
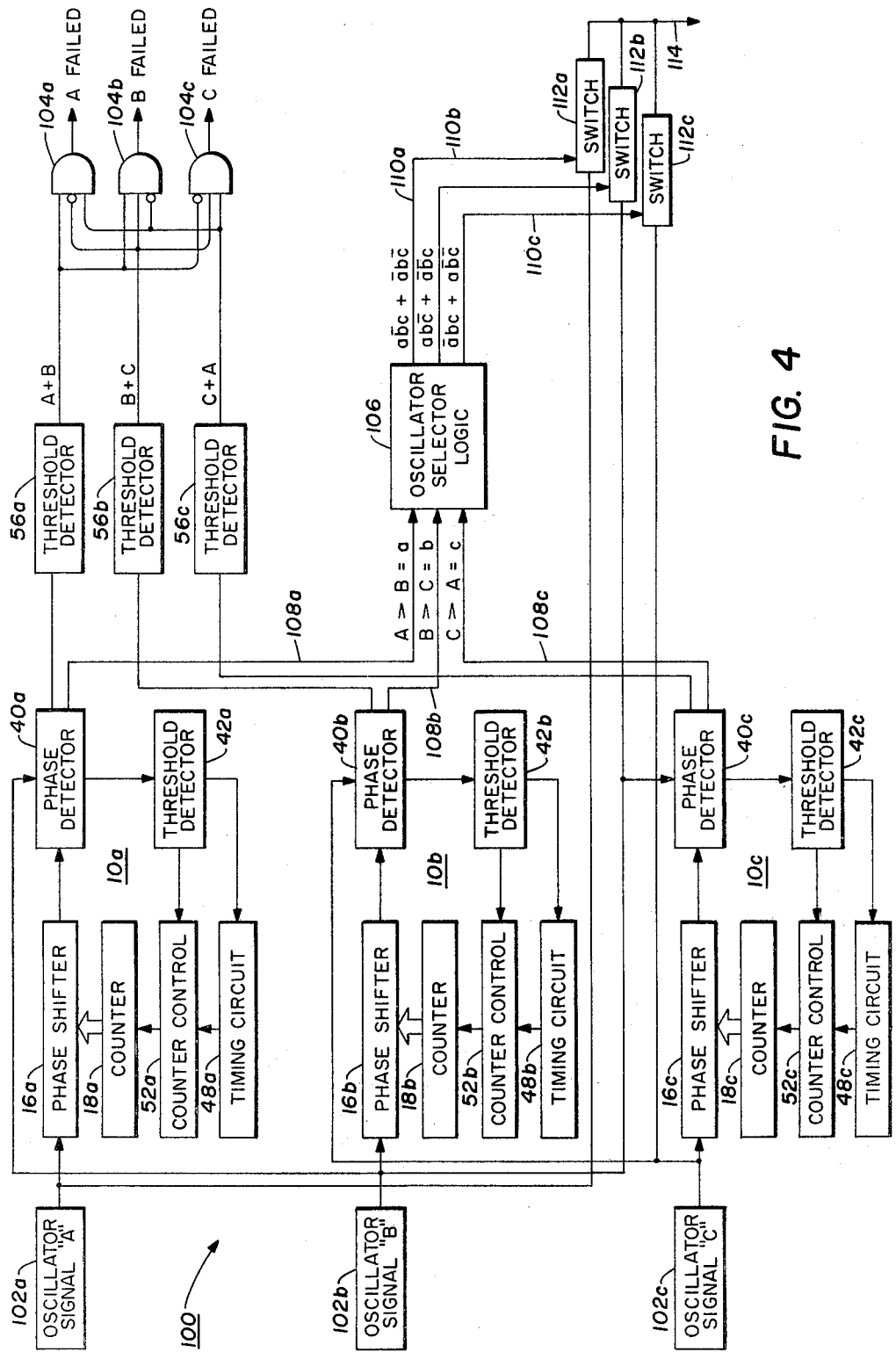
FIGURE 4 is a schematic block diagram of another system in accordance with the present invention.

Referring now to the drawings, a system for comparing a pair of frequency sources is indicated generally by the reference numeral 10 in FIGURE 1. Assume that oscillators 12 and 14 generate signals A and B which have the same nominal frequency, but may vary by a few parts per million. Signal A from oscillator 12 is applied to the input of a binary phase shifter including a binary phase shift network 16 having stages $P_1$–$P_7$ and a binary counter 18 having stages $S_1$–$S_7$ which control stages $P_1$–$P_7$ of the binary phase shift network 16, respectively. Stage $P_7$ provides 180° of phase shift when switched in, and each of the successive stages $P_6$–$P_1$ provides one-half the phase shift of the preceding stage when switched in. This provides a total phase shift of 360° minus the degree of phase shift in the least stage $P_1$, which is actually a full 360° phase shift capability since zero phase shift is also 360° phase shift. Of course, any number of stages can be provided for the phase shift network, depending upon the resolution desired.

Each stage $P_n$ of the phase shift network 16 may be comprised of the circuit indicated generally in FIGURE 2. An amplifier 20 is provided at the input of each stage to restore the amplitude of the signal and also provide isolation. The output from the amplifier 20 is applied to a phase shift circuit 22 and to an attenuator 24. A switch 26 connects the output of the phase shift circuit 22 to the output 28 of the stage and a switch 30 connects the output of the attenuator 24 to the output 28. Switch 26 is closed by a logic "1" level on the true output line 32 of stage $S_7$ of the counter 18, and switch 30 is turned "on" by a logic "1" level on a complement output 34 of stage $S_7$ of the counter 18. The phase shift circuit 22 may be of any conventional design suitable for use at the frequency of the signal sources 12 and 14, such as, for example, a resistor-capacitor network, or a length of transmission line for higher frequencies. The attenuator 24 may be of any conventional design suitable for the frequencies being used, such as a simple network comprised of a series resistor and a shunt resistor, for example. The only purpose of attenuator 24 is to insure that the signal level at the output 28 will be approximately the same whether the signal is directed through the phase shift circuit 22 or through the attenuator circuit 24. The switches 26 and 30 may be conventional transistors, field effect transistors, diodes or even electromechanical relays, depending upon the frequencies involved. Each of these successive stages $P_6$–$P_1$ may be of the identical configuration, with only the values of the components in the phase shift circuit 22 and the attenuators 24 varying. The phase shift network of each successive stage is switched in when the true output of the corresponding binary stage of the counter 18 is at a logic "1" level, and is switched out when the complement output is at a logic "1" level.

The counter 18 may be a conventional synchronous binary counter in which the stages are connected to count in the manner illustrated in the truth table of FIGURE 3. Thus, as the counter 18 counts, signal A from oscillator 12 is progressively delayed in phase in a linear manner by increments of approximately 2.82°, the value of stage $P_1$, over the entire 360° possible phase shift. This requires only 128 counts, which may be accomplished in a very short period of time. Other linear or nonlinear phase variation systems may be used for different applications.

The output from the phase shifter 16 is applied to a phase detector 40 which compares the phase delayed signal from oscillator 12 with the signal from oscillator 14. Phase detector 40 may be of any suitable conventional design and need only provide a voltage signal proportional to the algebraic difference of the instantaneous values of the two signals. For some applications hereafter described, it will be desirable to be able to also detect whether signal A leads or lags signal B during the delay period after the two signals are aligned.

The output from the phase detector is applied to a zero phase threshold detector 42 which produces a signal at outputs 44 and 46 when the instantaneous algebraic difference, and therefore the relative phase, of the two signals is zero. Output 44 is connected to start a timing circuit 48 which generates a repeat start signal on output 50 after a predetermined time period, such as, for example, 0.5 second. The repeat start signal is applied to a counter control 52. The signal on output 46 of the threshold detector is applied to the counter control 52 which stops the counter 18. Thus, the counter control 52 stops the counter in response to the output signal from the zero phase threshold detector 42, and starts the counter 18 after a predetermined time delay in response to an output signal from the timing circuit 48. The counter 18 may initially be set into operation from an external system by way of input 54.

The output of the phase detector 40 is also applied to a maximum phase threshold detector 56 which produces an output when the instantaneous algebraic sum of the two signals applied to the phase detector 40 reaches some predetermined maximum. The threshold detector 56 is connected to drive a suitable alarm system 58 or other indicator when the maximum phase difference occurs. The threshold detector is operated only during the delay period when the counter is at rest, as represented by the enable and disable lines 57a and 57b. Otherwise, since the counter may cycle the phase shift network through as much as 357.2°, the threshold level of the detector would sometimes be exceeded and an erroneous alarm given.

In the operation of the system 10, the counter 18 is started by a signal on input 54. Signal A is then progressively delayed in increments of about 2.82° for each count of the counter prior to its application to the phase detector 40. When the instantaneous algebraic difference of the two signals is zero, the zero phase threshold detector 42 stops the phase shifter by way of output 46 and starts the timing circuit 48. When the phase shifter is stopped, the degree of phase delay introduced by the phase shift network 16 remains the same for the predetermined delay period. After the lapse of the predetermined time period, which might be 0.5 second, for example, the timing circuit 48 generates a repeat start signal on output 50 and the counter control 52 starts the counter 18 operating. Signal A is progressively delayed in phase increments equal to stage $P_1$ until it is once again phase aligned with signal B, at which time the zero phase threshold detector 42 again causes the counter 18 to stop and the timing circuit 48 to start the timed delay period. This sequence is repeated as often as desired, typically continually.

The maximum phase threshold detector 56 detects when the difference in frequency between signal A and signal B exceeds a predetermined allowable maximum merely by producing an output if the phase signal from phase detector 40 ever exceeds a predetermined threshold level. The maximum frequency difference is determined by selecting the delay period of the timing circuit 48 and the threshold level of the maximum phase threshold detector 56. For example, assume that the signal A and signal B both have a nominal frequency of 1,000,000 Hz. and that an alarm is to be sounded if the two frequencies differ by more than one Hz. The frequency difference in Hz. is simply expressed as the phase in cycles divided by the period in seconds, where the phase in cycles equals the phase in degrees divided by 360. Thus, if the threshold detector 56 is set to detect the maximum phase difference of 90° and the timing circuit 48 to generate a repeat start pulse after a lapse of 0.25 second, the threshold detector 56 will sound the alarm if the difference in frequency between signals A and B is one Hz. or greater. This is applicable to signals of any frequency, since the absolute frequency of the signals does not enter into the calculations. If the phase output signal from the phase detector 40 does not exceed the threshold level during the delay period when the threshold detector 56 is enabled, then no alarm is sounded because the threshold detector is disabled while the phase of signal A is again delayed by the amount necessary to achieve momentary phase alignment. Of course, the allowable maximum difference between the frequencies of the two signals can be changed as desired by changing either the delay period produced by the timing circuit 48 or the threshold level of detector 56, or both.

The circuit 10 can be used to calibrate one frequency source with respect to another, in which case either signal A or signal B would be assumed to be the reference. Or the oscillators 12 and 14 may be used as redundant reference frequency sources in a system. The probability of two frequency sources both changing in the same manner is far less than the probability that the frequency of the one source being used will change. Therefore, as long as the two signals have the same frequency, within the selected tolerance, the likelihood is high that the one being used is functioning properly. If a failure is detected, neither of the signals should be used because it cannot be determined which signal has failed.

The system 10 as specifically illustrated in FIGURE 1 is used only to determine when the difference between the frequencies of signals A and B exceeds a predetermined maximum. However, with minor modifications the system can be used to accurately measure the difference in frequency between the frequencies of the two signals. The basic method employed by the system 10 entails first phase aligning the two signals and then measuring the phase change after a measured delay period. The period can be fixed and the phase measured either by counting the increments of the counter 18 required to realign the phase of the two signals after a predetermined time period, or the phase can be measured by the phase detector 40 after a predetermined time period. On the alternative, the phase may be fixed at a predetermined value, such as 90° or 180°, for example, and the time required to accumulate this phase shift after the two signals have been phase aligned can then be measured.

Another system in accordance with the present invention is indicated generally by the reference numeral 100 in FIGURE 4. The system 100 is comprised of three systems 10a, 10b and 10c for comparing the frequencies of two signals. Each of the systems 10a, 10b and 10c may be essentially identical to the system 10 of FIGURE 1, and corresponding components of systems 10a, 10b and 10c are therefore designated by the same reference numerals as in the system 10 followed by the reference characters a, b or c. System 10a compares signal A from oscillator 102a with signal B from oscillator 102b, system 10b compares signal B from oscillator 102b with signal C from oscillator 102c, and system 10c compares signal C with signal A.

An output from threshold detector 56a indicates that the difference in the frequencies of signals A and B exceeds a preselected maximum and this is taken to mean that either oscillator 102a or oscillator 102b has failed. Similarly, if threshold detector 56b produces an output, it is assumed that either oscillator 102b or oscillator 102c has failed, and if threshold detector 56c has an output, it is assumed that either oscillator 102a or oscillator 102c has failed. These three signals are applied to AND gates 104a, 104b and 104c in the manner illustrated. Thus, if threshold detectors 56a and 56c produce an output, but not threshold detector 56b, gate 104a produces an output which indicates that oscillator 102a has failed. Similarly, when gate 104b produces an output, oscillator 102b has failed, and when gate 104c has produced an output, oscillator 102c has failed. The outputs from gates 104a–104c may be applied to operate an alarm or other system to take the necessary precautionary measures as a result of one of the oscillators failing.

The phase detectors 40a, 40b and 40c also produce phase lead and phase lag output signals which are applied to an oscillator selector logic circuit 106 by way of channels 108a, 108b and 108c, respectively. Thus, phase detector 40a produces a signal indicating only that after the signal A has been aligned with signal B, signal A begins to either lead or lag signal B. If signal A leads signal B, then signal A has a higher frequency than signal B. This condition is arbitrarily represented by the logic expression $A>B=a$. For example, if signal A leads signal B after alignment, then conductor 108a may be at a logic "1" level, typically a positive voltage, to indicate the logic state $a$. On the other hand, if signal A lags signal B after alignment, then conductor 108a will be at a logic "0" level, typically ground potential, to represent the logic state $\bar{a}$. Similarly, phase detector 40b produces a signal indicating whether the frequency of signal B is greater or less than the frequency of signal C as represented by the expression $B>C=b$, and phase detector 40c produces a signal indicating whether the frequency of signal C is greater or less than the frequency of signal A as represented by the expression $C>A=c$.

The logic signals $a$, $b$ and $c$ are applied to the oscillator selector logic circuitry 106. The selector logic circuitry 106 then produces a logic "1" output on conductor 110a only when the logic expression $a\bar{b}c+\bar{a}b\bar{c}$ is met, a logic "1" on output 110b when the logic conditions $ab\bar{c}+\bar{a}\bar{b}c$ exist, and a logic "1" level on output 110c when the logic conditions $\bar{a}bc+a\bar{b}\bar{c}$ are met. The outputs 110a–110c control switches 112a, 112b and 112c, respectively. Each switch 112a–112c is turned "on" when the respective control 110a–110c is at a logic "1" level and is turned "off" when the respective control is at a logic "0" level. Thus, when the frequency of signal A is between the frequencies of signal B and signal C, switch 112a is turned "on" and oscillator 102a is connected to the output 114 of the system. similarly, when oscillator 102b is producing the center frequency, switch 112b is turned "on" so that oscillator 102b is connected to the output 114, and when oscillator 102c is producing the center frequency, switch 112c is turned "on" to connect oscillator 102c to the output 114. If the frequencies of two or more of the signals are closer than the resolution of the system, the logic circuit may automatically select one in preference to the other.

What is claimed is:

1. The method for measuring the difference in frequency of a pair of A.C. signals having the same nominal frequency which comprises shifting the phase of one of the signals until the two signals are momentarily in phase alignment, then measuring the degree of phase disalignment resulting during a predetermined period of time to determine the difference in frequency between the two signals.

2. The method defined in claim 1 wherein the period of time required to achieve a predetermined phase disalignment is measured.

3. The method for determining when the difference in frequency between two A.C. signals having the same nominal frequency exceeds a predetermined value which comprises shifting the phase of one of the signals until the two signals are momentarily in phase alignment and detecting whether the phase disalignment of the two signals exceeds a predetermined maximum within a predetermined time period.

4. The method for determining which of three A.C. signals A, B and C, having the same nominal frequency, has the center frequency of the three which comprises comparing signal A and signal B and producing a logic signal $a$ when the frequency of signal A is greater than the frequency of signal B and a logic signal $\bar{a}$ when the frequency of signal A is less than the frequency of signal B, comparing signal B and signal C and producing a logic signal $b$ when the frequency of signal B is greater than the frequency of signal C and a logic signal $\bar{b}$ when the frequency of signal B is less than the frequency of signal C, comparing signal C with signal A and producing a logic signal $c$ when the frequency of signal C is greater than the frequency of signal A and producing a logic signal $\bar{c}$ when the frequency of signal C is less than the frequency of signal A, producing a first logic signal representative of signal A being the center frequency when logic signals $a\bar{b}c$ or $\bar{a}b\bar{c}$ exist, producing a second logic signal representative of signal B being the center frequency when the logic signals $ab\bar{c}$ or $\bar{a}\bar{b}c$ exist, and producing a third logic signal representative of signal C being the center frequency when logic signals $\bar{a}bc$ or $a\bar{b}\bar{c}$ exist.

5. The method defined in claim 4 wherein logic signals $a$, $\bar{a}$, $b$, $\bar{b}$, $c$ and $\bar{c}$ are produced by periodically phase aligning signal A with signal B, signal B with signal C, and signal C with signal A by shifting the phase of one of each pair of signals and then detecting whether one of the signals of each pair leads or lags the other signal of the pair as a measure of the relative frequency.

6. The method defined in claim 4 further characterized by producing a logic signal $A+B$ when the difference in frequency between signal A and signal B exceeds a predetermined maximum, producing a logic signal $B+C$ when the frequency difference between signal B and signal C exceeds a predetermined maximum, producing a logic signal $C+A$ when the frequency difference between signal C and signal A exceeds a predetermined maximum, producing a fourth logic signal representative of signal A being faulty when logic signal $A+B$ and logic signal $C+A$ exist but not logic signal $B+C$, producing a fifth logic signal representative of signal B being faulty when logic signals $A+B$ and $B+C$ exist but not signal $C+A$, and producing a sixth logic signal representative of signal C being faulty when logic signals $B+C$ and $C+A$ exist but not logic signal $A+B$.

7. In a system for comparing the frequencies of first and second signals having the same nominal frequency, the combination of a controllable phase shifter for progressively shifting the phase of one of the signals, a phase detector for comparing the phase of said one signal after its delay with the phase of the other signal, means for detecting when the two signals are in phase and stopping the phase shifter to hold the phase shift for a predetermined time period, and means for detecting whether the phase between the two signals exceeds a predetermined maximum within the predetermined time period.

8. The combination defined in claim 7 wherein the phase shifter comprises a phase shift network having a plurality of binarily weighted phase shift stages, each succeeding stage having twice the phase shift of the preceding stage and all of the stages totaling 360° less the phase shift of the first stage, and a binary counter connected to operate the phase shift network in a sequence to progressively change the phase shift introduced by the network by an amount equal to the phase shift of the least significant stage for each count of the counter.

9. In a system for comparing the frequencies of first and second A.C. signals, the combination of a phase shift network for shifting the phase of the first signal, a phase detector for comparing the phase of the first signal as shifted by the phase shift network and the phase of the second signal and producing an output representative of the phase relationship between the two signals, a minimum threshold detector connected to the output of the phase detector for producing an output signal when the first and second signals as applied to the phase detector are at zero phase, a timing circuit connected to the output of the minimum threshold detector for producing an output signal after a predetermined time period, a counter connected to operate the phase shift network so as to sequentially increase the phase shift introduced by the phase shift network by predetermined amounts for each count of the counter, and a counter control connected to the output of the minimum threshold detector and the output of the timing circuit for stopping the operation of the counter in response to an output signal from the minimum threshold detector and for starting the counter in response to an output signal from the timing circuit.

10. The combination defined in claim 9 further characterized by a maximum threshold detector connected to the output of the phase detector for producing an output when the output of the phase detector indicates that the phase difference between the signals exceeds a predetermined maximum value during the timing period whereby the output of the maximum threshold detector will be representative of the frequency difference between the first and second signals exceeding a predetermined maximum value.

11. In a system for selecting the A.C. signal having the center frequency from signals A, B and C, the combination of means for comparing signal A to signal B and producing a logic signal $a$ when the frequency of signal A exceeds the frequency of signal B and a logic signal $\bar{a}$ when the frequency of signal A is less than the frequency of signal B, means for comparing signal B and signal C and for producing a logic signal $b$ when the frequency of signal B exceeds the frequency of signal C and a logic signal $\bar{b}$ when the frequency of signal B is less than the frequency of signal C, means for comparing signal C and signal A and producing a logic signal $c$ when the frequency of signal C exceeds the frequency of signal A and a logic signal $\bar{c}$ when the frequency of signal C is less than the frequency of signal A, selector logic circuit means for producing a first logic signal when logic signals $a\bar{b}c$ or $\bar{a}b\bar{c}$ exist, for producing a second logic signal when $ab\bar{c}$ or $\bar{a}\bar{b}c$ exist, and a third logic signal when logic signals $\bar{a}bc$ or $a\bar{b}\bar{c}$ exist.

12. The combination defined in claim 11 further characterized by first, second and third switch means operated by the first, second and third logic signals for connecting the signal A to an output of the system during the existence of the first logic signal, for connecting signal B to the output of the system during the existence of the second logic signal and for connecting signal C to the output of the system during the existence of the third logic signal.

13. The combination defined in claim 11 wherein the means for comparing signal A to signal B, the means for comparing signal B to signal C and the means for comparing signal C to signal A each comprises a controllable phase shifter for progressively shifting the phase of one of the signals, a phase detector for comparing the shifted phase of said one signal to the phase of the other signal and producing a first signal representative of a zero phase difference and a second signal representative of whether one signal leads or lags the other signal, means connected to the phase detector for stopping the phase shifter to hold the phase angle when the signals are in zero phase relationship for a predetermined time period and then restarting the phase shifter.

14. In a system for comparing the frequencies of first and second signals having the same nominal frequency, the combination of a controllable phase shifter for progressively shifting the phase of one of the signals, a phase detector for comparing the phase of said one signal after its delay with the phase of the other signal, and means for detecting when the two signals are in phase and stopping the phase shifter to hold the phase angle for a predetermined time period to determine the amount of phase disalignment between said first and second signals occurring during said predetermined time period.

References Cited

UNITED STATES PATENTS

| | | | |
|---|---|---|---|
| 2,878,448 | 3/1959 | Maxey | 324—82 X |
| 2,910,586 | 10/1959 | Kohler | 328—155 |
| 3,263,174 | 7/1966 | Bjorkman et al. | 328—155 X |
| 3,271,688 | 9/1966 | Gschwind | 328—155 X |
| 3,378,833 | 4/1968 | Anderson | 324—79 X |

ALFRED E. SMITH, Primary Examiner

U.S. Cl. X.R.

328—155; 331—14, 18